US009137790B2

(12) United States Patent
Chiu

(10) Patent No.: US 9,137,790 B2
(45) Date of Patent: Sep. 15, 2015

(54) METHOD FOR PERFORMING HYBRID AUTOMATIC REPEAT REQUEST, AND BASE STATION AND MOBILE DEVICE USING THE SAME

(71) Applicant: Industrial Technology Research Institute, Hsinchu (TW)

(72) Inventor: Chun-Yuan Chiu, Pingtung County (TW)

(73) Assignee: Industrial Technology Research Institute, Hsinchu (TW)

( * ) Notice: Subject to any disclaimer, the term of this patent is extended or adjusted under 35 U.S.C. 154(b) by 175 days.

(21) Appl. No.: 13/929,802

(22) Filed: Jun. 28, 2013

(65) Prior Publication Data

US 2014/0010175 A1 Jan. 9, 2014

Related U.S. Application Data

(60) Provisional application No. 61/669,637, filed on Jul. 9, 2012.

(30) Foreign Application Priority Data

Mar. 18, 2013 (TW) .............................. 102109539 A

(51) Int. Cl.
*H04W 72/04* (2009.01)
*H04L 1/18* (2006.01)
(Continued)

(52) U.S. Cl.
CPC ........... *H04W 72/042* (2013.01); *H04L 1/1896* (2013.01); *H04L 1/1887* (2013.01); *H04L 2001/0093* (2013.01); *H04W 72/04* (2013.01); *H04W 76/023* (2013.01); *H04W 84/18* (2013.01)

(58) Field of Classification Search
CPC ........... H04L 5/14; H04L 5/1423; H04L 5/16; H04W 84/18; H04W 84/12; H04W 72/04; H04W 88/08; H04W 76/00; H04W 72/0406; H04W 72/0413; H04W 72/042; H04W 72/12; H04W 72/1205; H04W 72/121; H04W 72/1278; H04W 80/04; H04W 80/18; H04W 88/06; H04W 74/08
See application file for complete search history.

(56) References Cited

U.S. PATENT DOCUMENTS 8,842,611 B2\* 9/2014 Du et al. ....................... 370/328
2011/0255450 A1 10/2011 Wang et al.
(Continued)

FOREIGN PATENT DOCUMENTS

CA 2780390 5/2011
TW I326998 7/2010
(Continued)

OTHER PUBLICATIONS

"Office Action of Taiwan Counterpart Application", issued on Oct. 23, 2014, p. 1-p. 3.

*Primary Examiner* — Warner Wong
(74) *Attorney, Agent, or Firm* — Jianq Chyun IP Office

(57) ABSTRACT

A method for performing hybrid automatic repeat request (HARQ), a base station (BS), and a mobile device are provided. In the method, a wireless resource is allocated by the BS, and whether to perform a device-to-device (D2D) communication is determined. When the D2D communication is performed, a first resource allocation message is transmitted by the BS to a first mobile device and a second mobile device, and the first mobile device, working as a transmitter, transmits a data packet to the second mobile device, working as a receiver, according to the first resource allocation message. A HARQ feedback packet is received by the BS from the second mobile device to determine whether the data packet is successfully transmitted. When the HARQ feedback packet is a negative acknowledgement (NACK), the BS retains the original wireless resource or transmits a second resource allocation message to the first and the second mobile devices.

35 Claims, 8 Drawing Sheets

(51) Int. Cl.
  *H04W 84/18* (2009.01)
  *H04W 76/02* (2009.01)
  *H04L 1/00* (2006.01)

(56) References Cited

U.S. PATENT DOCUMENTS

| | | |
|---|---|---|
| 2011/0305179 A1 | 12/2011 | Wang et al. |
| 2012/0028672 A1 | 2/2012 | Chen et al. |
| 2012/0051315 A1 | 3/2012 | Wang et al. |
| 2012/0093098 A1 | 4/2012 | Charbit et al. |
| 2012/0106517 A1 | 5/2012 | Charbit et al. |
| 2012/0120885 A1 | 5/2012 | Wang et al. |
| 2012/0163252 A1 | 6/2012 | Ahn et al. |
| 2013/0157676 A1* | 6/2013 | Baek et al. .................. 455/452.1 |
| 2013/0170468 A1* | 7/2013 | Baker et al. .................... 370/330 |
| 2013/0315196 A1* | 11/2013 | Lim et al. ...................... 370/329 |
| 2014/0003400 A1* | 1/2014 | Lim et al. ...................... 370/336 |
| 2014/0140286 A1* | 5/2014 | Kim et al. ...................... 370/329 |
| 2014/0187283 A1* | 7/2014 | Nimbalker et al. ......... 455/550.1 |
| 2014/0226629 A1* | 8/2014 | Kim et al. ...................... 370/331 |
| 2014/0286284 A1* | 9/2014 | Lim et al. ...................... 370/329 |
| 2014/0334392 A1* | 11/2014 | Gage et al. .................... 370/329 |

FOREIGN PATENT DOCUMENTS

| | | |
|---|---|---|
| TW | I347762 | 8/2011 |
| TW | I349495 | 9/2011 |
| TW | I354467 | 12/2011 |

\* cited by examiner

METHOD FOR PERFORMING HYBRID AUTOMATIC REPEAT REQUEST, AND BASE STATION AND MOBILE DEVICE USING THE SAME

CROSS-REFERENCE TO RELATED APPLICATION

This application claims the priority benefits of U.S. provisional application Ser. No. 61/669,637, filed on Jul. 9, 2012 and Taiwan application serial no. 102109539, filed on Mar. 18, 2013. The entirety of each of the above-mentioned patent applications is hereby incorporated by reference herein and made a part of this specification.

TECHNICAL FIELD

The technical field relates to a method for performing hybrid automatic repeat request (HARQ), and a base station and a mobile device using the same.

BACKGROUND

With the widespread of mobile broadband applications and the massive amounts of data to be transmitted among end devices, the resource of the radio spectrum has become increasingly scarce, and the technique of creating available bandwidths from the space domain has been developed. Thus, the 3rd Generation Partnership Project (3GPP) has been focusing on the feasibility of supporting device-to-device (D2D) communication in the long term evolution-advanced (LTE-A) standard and the establishment of system requirements. D2D communication is a technique which allows mobile devices to directly communicate with each other by using licensed bands or unlicensed bands (for example, wireless local area networks (WLAN)) in conjunction with heterogeneous networks after proximity discovery under the control of a wireless communication system. The D2D communication technique increases the system spectral efficiency, reduces the transmitting power of each mobile device, and resolves the problem of insufficient spectral resources in a wireless communication system to a certain extent. In addition, the D2D communication technique could satisfy the requirements of proximity communications, such as electronic direct mails and alarm systems, in some commercial applications and during disaster relief.

FIG. 1 is a diagram illustrating an application scenario of D2D communication according to an exemplary embodiment. Referring to FIG. 1, originally, the mobile devices UE1 and UE2 communicate with each other through uplink and downlink communication connections established by a wireless communication system. While the mobile device UE1 slowly moves closer to the mobile device UE2, the communication connection between the mobile devices UE1 and UE2 is switched to D2D communication to reduce the network load (network offloading). While the mobile devices UE1 and UE2 slowly move away from each other, the communication connection between the mobile devices UE1 and UE2 is switched back to the original uplink/downlink communication for D2D communication is not feasible anymore.

The issue of how to maintain the communication quality between two mobile devices when the original uplink/downlink communication is switched to D2D communication is exposed in the application scenario illustrated in FIG. 1. FIG. 2 is a timing diagram of an uplink/downlink communication procedure according to an exemplary embodiment. Referring to FIG. 2, the base station eNB and the mobile device UE have to measure features (including channel quality, pathloss, and timing advance) of the wireless link first. The measurement result of the channel quality allows the base station eNB to optimize the system spectral efficiency when wireless resources are allocated. The measurement result of the pathloss allows the mobile device UE to calculate the transmission power for transmitting data to the base station eNB. The calibration of the timing advance allows the data transmitted by the mobile device UE to be received by the base station eNB at a correct time point even after a propagation delay.

After measuring the features of the wireless link, the base station eNB allocates wireless resources appropriately for the mobile device UE according to the measurement results and transmits the resource allocation result and some control parameters to the mobile device UE. Because the condition of the wireless link may change quickly from time to time due to changes of the transmission environment and the moving speed, the base station dynamically and quickly allocates the wireless resources to the mobile device UE to adapt to any change of the condition of the wireless link. During the data transmission process, LTE extends the hybrid automatic repeat request (HARQ) mechanism adopted in the high speed packet access (HSPA) technology to enhance the data transmission reliability.

HARQ is a technique integrating the feed-forward error correction (FEC) technique and the automatic repeat request (ARQ) technique. The main concept of HARQ is keeping useful information in failed transmission procedures and using such information during the next transmission procedure, so as to increase the success rate of retransmission. HARQ retransmission could be carried out in a synchronous or an asynchronous manner. Regarding the synchronous retransmission, the timing of the HARQ retransmission is pre-determined, and when the receiver fails to receive the data and sends a negative acknowledgement (NACK) back, the transmitter does not wait for an additional control signal and retransmits the data in a pre-scheduled subframe by using the same wireless resources. Contrarily, regarding the asynchronous retransmission, the timing of the HARQ retransmission and the wireless resources used during the retransmission are dynamically changed through control signals.

To maintain the communication quality of mobile devices in D2D communication, the HARQ retransmission mechanism needs to be adopted in D2D communication to enhance the data transmission reliability. However, an existing HARQ program is to be executed only between a base station and a mobile device. Thereby, how to perform HARQ among a base station and two mobile devices which are about to perform D2D communication has become a important issue in the industry.

SUMMARY

The disclosure is directed to a method for performing a hybrid automatic repeat request (HARQ) retransmission mechanism for device-to-device (D2D) communication, in which a D2D communication transmitter and a D2D communication receiver are allowed to realize HARQ with the help of a base station so that the communication quality of the D2D communication could be maintained.

An embodiment of the disclosure provides a method for performing HARQ. The method is adapted to a base station in a wireless communication system and includes following steps. A wireless resource is allocated by a base station, and whether to perform a D2D communication is determined. When the D2D communication is performed, a first resource allocation message is transmitted to a first mobile device and a second mobile device by the base station, so that the first mobile device, as a transmitter, transmits a data packet to the second mobile device, as a receiver, according to the first resource allocation message. A HARQ feedback packet is received from the second mobile device by the base station to determine whether the data packet is successfully transmitted. When the HARQ feedback packet is a negative acknowledgement (NACK), the wireless resource allocated in the first resource allocation message is retained or a second resource allocation message is transmitted to the first mobile device and the second mobile device by the base station.

An embodiment of the disclosure provides a base station including a transceiver and a processor. The transceiver is configured to transmit and receive wireless signals. The processor is coupled to the transceiver and configured to execute following operations. The processor allocates a wireless resource used by at least one mobile device. When a D2D communication is performed, the processor transmits a first resource allocation message to a first mobile device and a second mobile device, so that the first mobile device, as a transmitter, transmits a data packet to the second mobile device, as a receiver, according to the first resource allocation message. The processor receives a HARQ feedback packet from the second mobile device to determine whether the data packet is successfully transmitted. When the HARQ feedback packet is a NACK, the processor retains the wireless resource allocated in the first resource allocation message or transmits a second resource allocation message to the first mobile device and the second mobile device.

An embodiment of the disclosure provides a method for performing HARQ. The method is adapted to a first mobile device and a second mobile device performing D2D communication in a wireless communication system. The method includes following steps. Whether to perform the D2D communication is determined by the first mobile device and the second mobile device by monitoring a first resource allocation message from a base station. When the D2D communication is performed, the first mobile device, which is instructed to serve as a transmitter, transmits a data packet to the second mobile device, which is instructed to serve as a receiver, according to a wireless resource allocated in the first resource allocation message. A HARQ feedback packet is transmitted by the second mobile device to the base station to respond that whether the data packet is successfully received.

An embodiment of the disclosure provides a mobile device including a transceiver and a processor. The transceiver is configured to transmit and receive wireless signals. The processor is coupled to the transceiver and configured to execute following operations. The processor receives a first resource allocation message from a base station to determine whether to perform a D2D communication. When the first resource allocation message instructs the mobile device to perform the D2D communication as a transmitter, the processor transmits a data packet to another mobile device according to a wireless resource allocated in the first resource allocation message. When the first resource allocation message instructs the mobile device to perform the D2D communication as a receiver, the processor receives the data packet from the other mobile device according to the wireless resource allocated in the first resource allocation message and transmits a HARQ feedback packet to the base station to respond that whether the data packet is successfully received.

As described above, in the method for performing HARQ provided by the disclosure, mobile devices performing D2D communication are allowed to realize HARQ with the help of a base station, so that the communication quality of the D2D communication could be maintained.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

It has to be understood first that in a long term evolution (LTE) system, uplink/downlink communication respectively adopt synchronous/asynchronous HARQ. Namely, a mobile device adopts the synchronous HARQ to transmit data and adopts the asynchronous HARQ to receive data.

Figure 1:
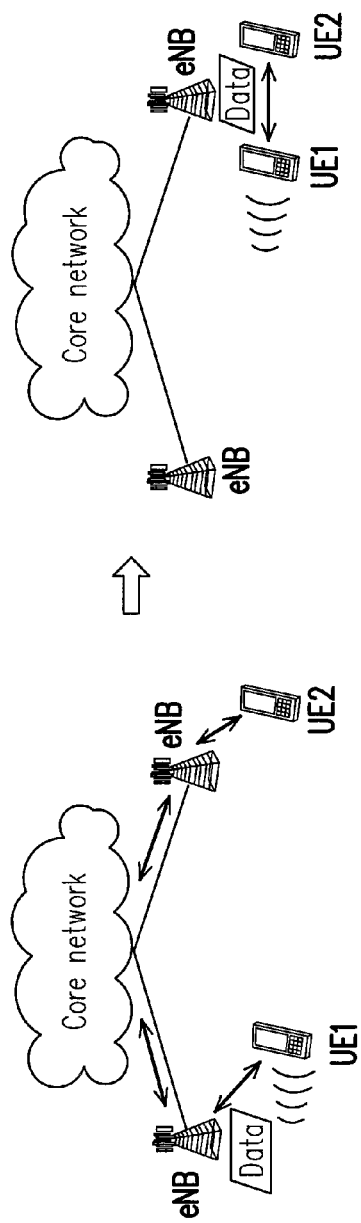
FIG. 1 is a diagram illustrating an application scenario of device-to-device (D2D) communication according to an exemplary embodiment.
Figure 2:
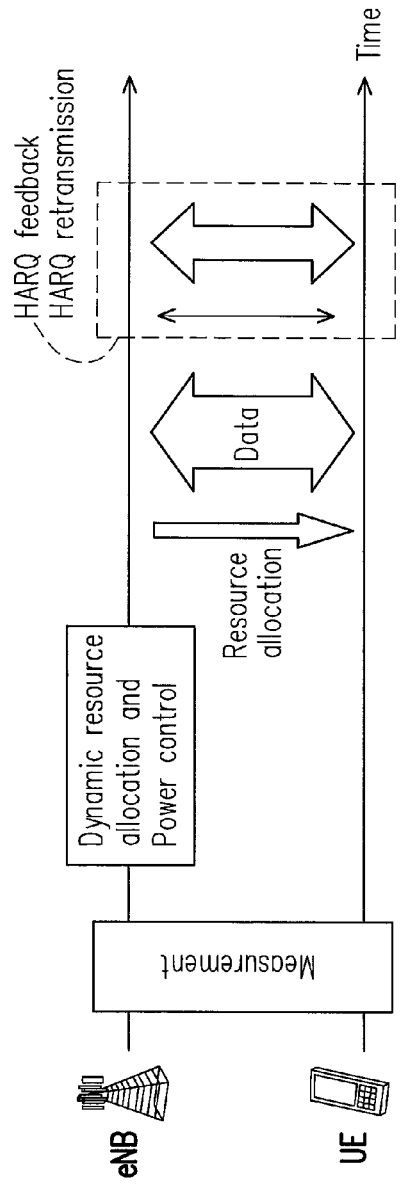
FIG. 2 is a timing diagram of an uplink/downlink communication procedure according to an exemplary embodiment.
Figure 3A:
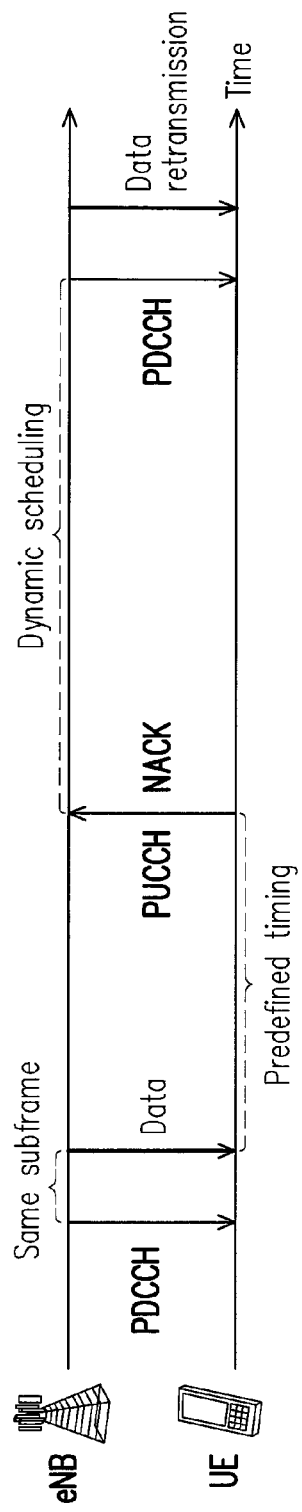
FIG. 3A is a timing diagram of a downlink communication adopting asynchronous HARQ according to an exemplary embodiment of the disclosure.

FIG. 3A is a timing diagram of a downlink communication adopting asynchronous HARQ according to an exemplary embodiment of the disclosure. Referring to FIG. 3A, the base station eNB transmits a resource allocation message to the mobile device UE through a physical downlink control channel (PDCCH). The mobile device UE receives data packets in the same subframe. When the mobile device UE fails to receive a data packet, the mobile device UE automatically sends a negative acknowledgement (NACK) to the base station eNB at a predefined timing through a physical uplink control channel (PUCCH). The base station eNB re-allocates resources based on dynamic scheduling and sends a new resource allocation message to the mobile device UE through the PDCCH. The mobile device UE receives the same data packet in the same subframe. Herein the predefined timing is defined to be 4 subframes in the 3GPP LTE/LTE-A standards.

Figure 3B:
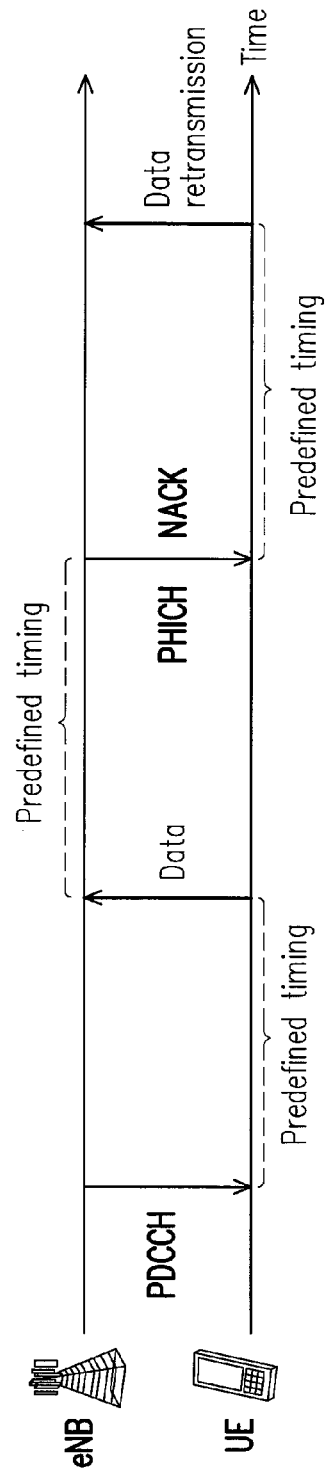
FIG. 3B is a timing diagram of an uplink communication adopting synchronous HARQ according to an exemplary embodiment of the disclosure.

FIG. 3B is a timing diagram of an uplink communication adopting synchronous HARQ according to an exemplary embodiment of the disclosure. Referring to FIG. 3B, after the base station eNB sends a resource allocation message to the mobile device UE through the PDCCH, the mobile device UE uploads a data packet to the base station eNB after a predefined timing. When the base station eNB fails to receive the data packet, the base station eNB sends a NACK to the mobile device UE in a predefined subframe through a physical hybrid-ARQ indicator channel (PHICH). The mobile device UE does not wait for any additional control signal and retransmits the data packet in the predefined subframe by using the same wireless resources.

To maintain the communication quality of a mobile device in D2D communication and reduce the complexity and cost in switching communication connections, it is assumed in following exemplary embodiments that all the wireless resources are dynamically and quickly allocated by a base station through a PDCCH. With such a precondition, the disclosure provides a three-terminal communication method which realizes synchronous and asynchronous HARQ retransmission under the control of a base station for D2D communication. Below, exemplary embodiment of the disclosure will be described with reference to accompanying drawings.

First Exemplary Embodiment

It should be understood first that because the wireless resources for both uplink/downlink communication and D2D communication are allocated by the base station through the PDCCH, if asynchronous HARQ is to be performed for D2D communication, the D2D communication transmitter should be able to know whether to perform synchronous HARQ to transmit uplink data to the base station or perform asynchronous HARQ to transmit data to the D2D communication receiver once the D2D communication transmitter receives the resource allocation message from the PDCCH.

In an exemplary embodiment, the base station adds an indicator in the resource allocation message (i.e., a downlink control information (DCI)) sent through the PDCCH to indicate whether the DCI is resource allocation regarding the D2D communication or general uplink/downlink communication. In another exemplary embodiment, the base station allocates resources for the D2D communication through a D2D communication specific cell radio network temporary identifier (C-RNTI) (i.e., the DCI for allocating resources for the D2D communication is scrambled by the C-RNTI before being transmitted through the PDCCH). Thus, besides searching for the DCI by using the original C-RNTI, the D2D communication transmitter and the D2D communication receiver have to search for the DCI by using a D2D communication specific C-RNTI.

Figure 4:
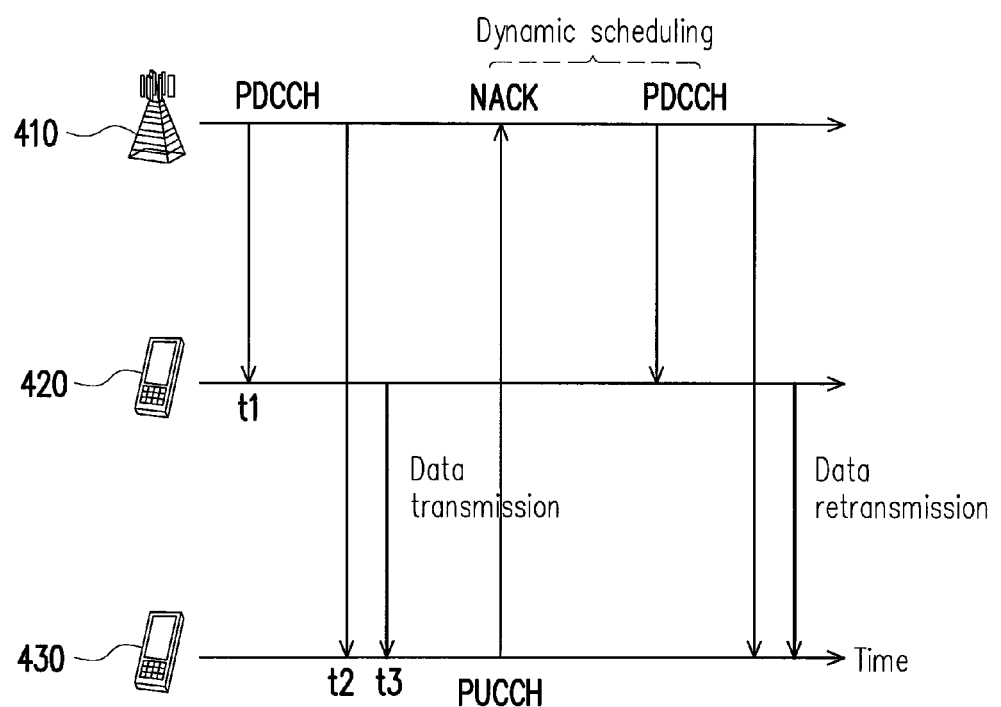
FIG. 4 is a timing diagram of a D2D communication performing asynchronous HARQ three-terminal communication according to a first exemplary embodiment of the disclosure.
Figure 5:
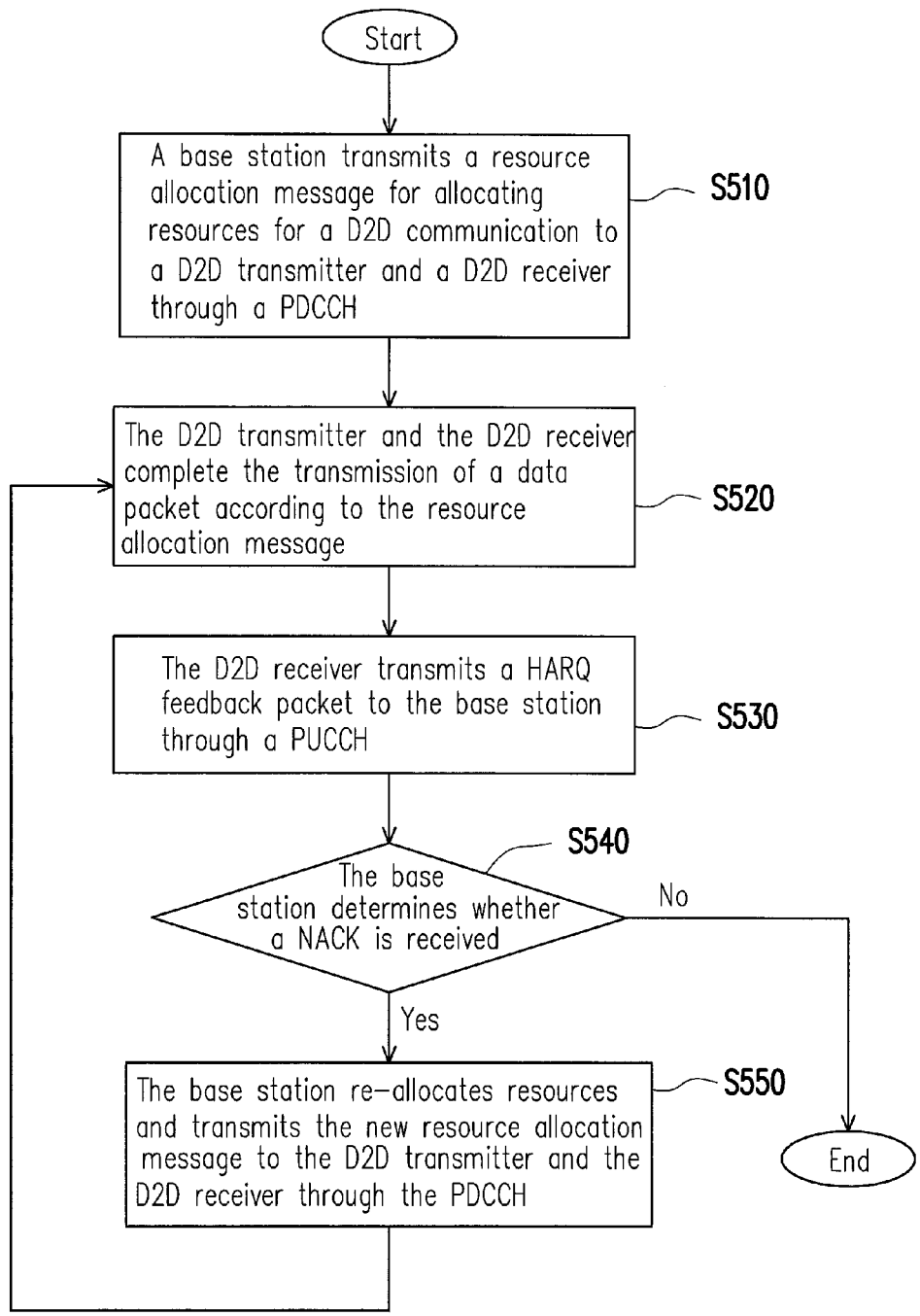
FIG. 5 is a flowchart of a D2D communication performing asynchronous HARQ three-terminal communication according to the first exemplary embodiment of the disclosure.

FIG. 4 is a timing diagram of a D2D communication performing asynchronous HARQ three-terminal communication according to the first exemplary embodiment of the disclosure. FIG. 5 is a flowchart of a D2D communication performing asynchronous HARQ three-terminal communication according to the first exemplary embodiment of the disclosure. Please refer to both FIG. 4 and FIG. 5 for following description.

First, in step S510, the base station 410 allocates a wireless resource and transmits a resource allocation message (i.e., DCI) for allocating resources for a D2D communication to the D2D communication transmitter 420 and the D2D communication receiver 430 through a PDCCH (step S510). Herein the base station 410 may indicate that the DCI is resource allocation regarding the D2D communication by adding an indicator in the DCI transmitted through the PDCCH.

In the present embodiment, the DCI transmitted by the base station 410 includes a transmitter resource allocation message (i.e., transmitter DCI) and a receiver resource allocation message (i.e., receiver DCI), wherein the transmitter DCI may be the same as or different from the receiver DCI. Referring to FIG. 4, the base station 410 first transmits the transmitter DCI to the D2D communication transmitter 420 through the PDCCH at time t1. Then, the base station 410 transmits the receiver DCI to the D2D communication receiver 430 through the PDCCH at time t2.

Next, after receiving the resource allocation message, the D2D communication transmitter 420 and the D2D communication receiver 430 perform a data packet transmission according to instructions of the resource allocation message (step S520). To be specific, the D2D communication transmitter 420 transmits a data packet to the D2D communication receiver 430 at time t3. The difference between time t1 and time t3 is 4 subframes, and time t2 and time t3 belong to the same subframe. Accordingly, the timing for the base station 410 to respectively transmit the transmitter DCI and the receiver DCI conforms to the specifications of 3GPP LTE/LTE-A. However, in another embodiment, the base station 410 may also transmit the same DCI to the D2D communication transmitter 420 and the D2D communication receiver 430 at the same time. However, how a base station transmits DCIs to a D2D communication transmitter and a D2D communication receiver is not limited in the disclosure.

The D2D communication transmitter 420 does not expect to receive any HARQ feedback packet after it transmits the data packet. Instead, the D2D communication transmitter 420 directly monitors the PDCCH and waits for the next resource allocation message from the base station 410.

In step S530, after the D2D communication receiver 430 receives the data packet according to the resource allocation message, the D2D communication receiver 430 transmits a HARQ feedback packet to the base station 410 through a PUCCH. Herein the HARQ feedback packet may be an acknowledgement (ACK) signal or a negative acknowledgement (NACK) signal. If the data packet is successfully received, the D2D communication receiver 430 sends the ACK signal back to the base station 410. If the data packet is not successfully received, the D2D communication receiver 430 sends the NACK signal to the base station 410.

In step S540, the base station determines whether the NACK signal is received. If the NACK signal is not received, the transmission of the data packet is completed. If the NACK signal is received, in step S550, the base station 410 re-allocates the resource based on dynamic scheduling and sends a new resource allocation message (i.e., a second resource allocation message) to the D2D communication transmitter 420 and the D2D communication receiver 430 through the PDCCH. How the base station transmits the new resource allocation message has been explained in foregoing step S510 therefore will not be described herein.

In addition, it should be noted that with asynchronous HARQ, because all data transmissions and retransmissions have to wait for the base station 410 to dynamically allocate resources through the PDCCH, the D2D communication transmitter 420 and the D2D communication receiver 430 could be notified to transmit a new data packet or retransmit an old data packet by using a new data indicator (NDI) field in the DCI in the PDCCH. If there are more data packets to be transmitted, the base station 410 continues to allocate resources for the next data packet through the PDCCH.

Second Exemplary Embodiment

Same as that when asynchronous HARQ is performed, to perform synchronous HARQ for a D2D communication, the D2D communication receiver should be able to know whether to perform asynchronous HARQ to receive downlink data from the base station or perform synchronous HARQ to receive data from the D2D communication transmitter once the D2D communication receiver receives a resource allocation message. The base station could also add an indicator in the resource allocation message (i.e., a DCI) or use a D2D communication specific C-RNTI scrambling the resource allocation message to indicate whether the DCI is resource allocation regarding the D2D communication or general uplink/downlink communication.

Figure 6:
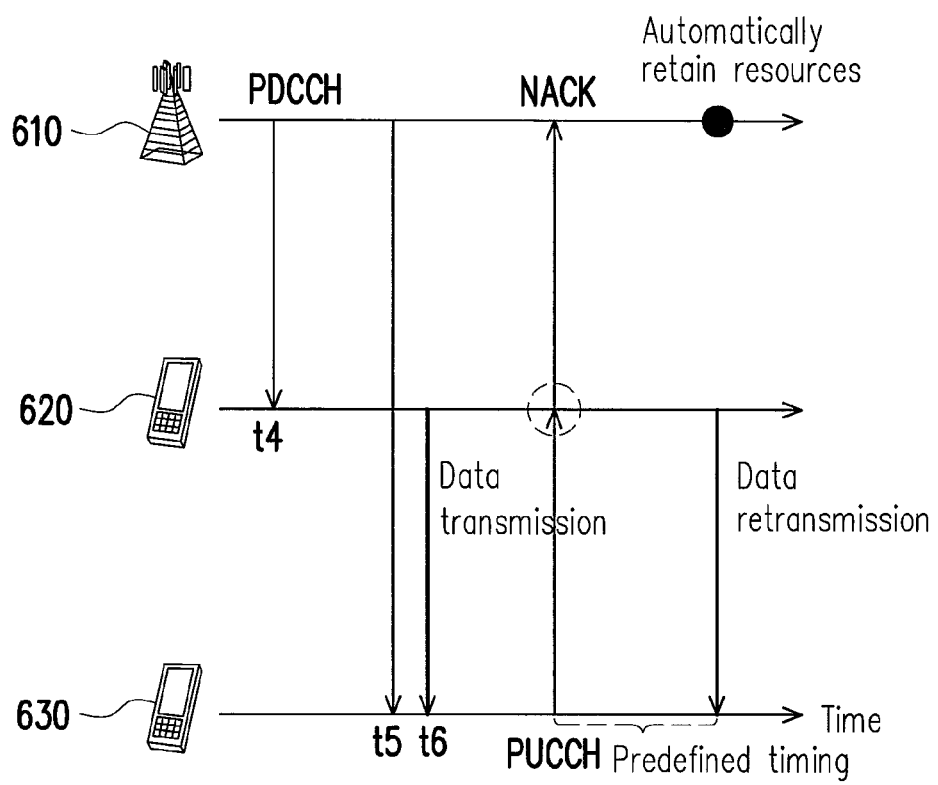
FIG. 6 is a timing diagram of a D2D communication performing synchronous HARQ three-terminal communication according to a second exemplary embodiment of the disclosure.
Figure 7:
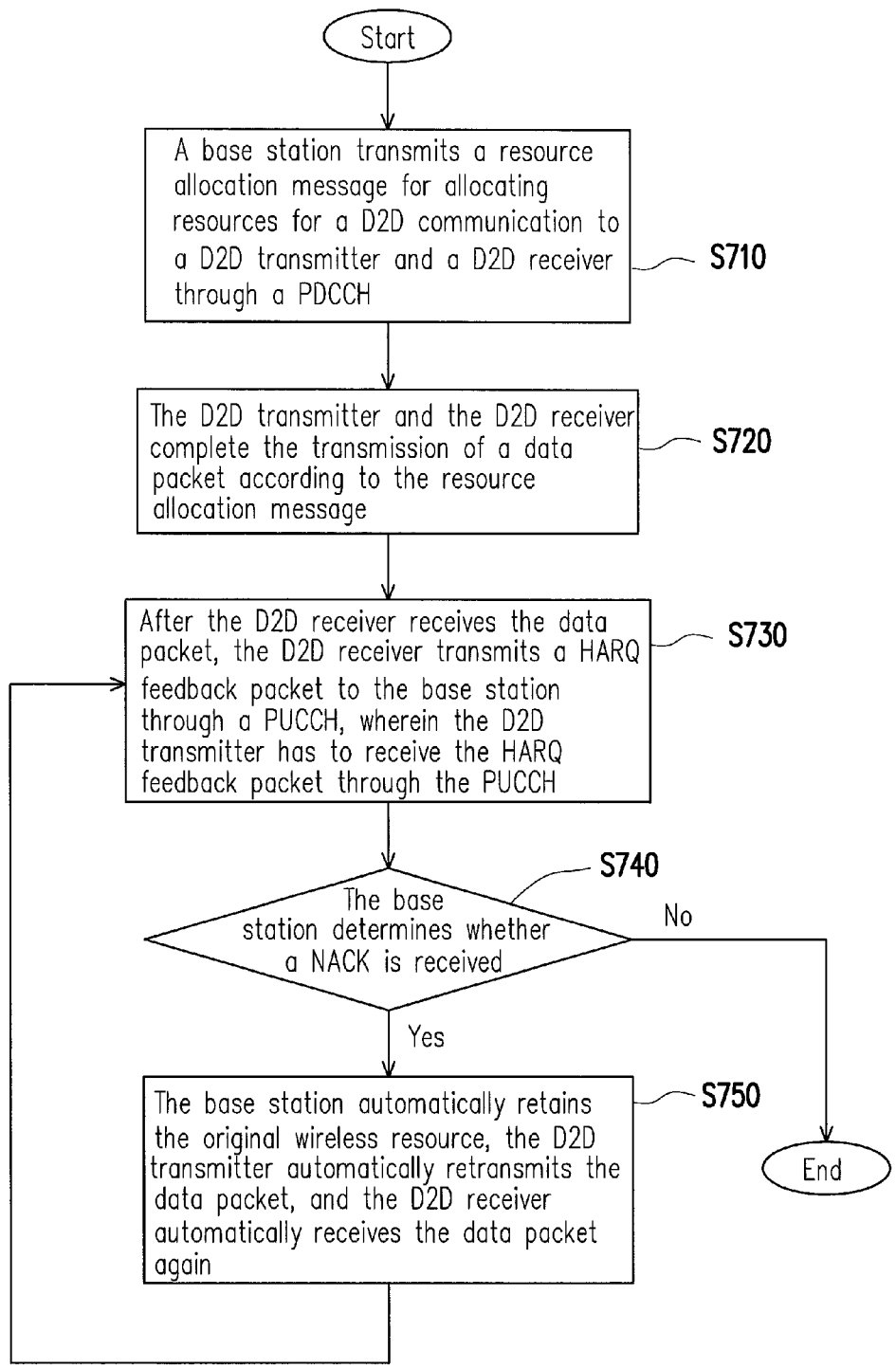
FIG. 7 is a flowchart of a D2D communication performing synchronous HARQ three-terminal communication according to the second exemplary embodiment of the disclosure.

FIG. 6 is a timing diagram of a D2D communication performing synchronous HARQ three-terminal communication according to the second exemplary embodiment of the disclosure. FIG. 7 is a flowchart of a D2D communication performing synchronous HARQ three-terminal communication according to the second exemplary embodiment of the disclosure. Please refer to both FIG. 6 and FIG. 7 for following descriptions.

First, in step S710, the base station 610 allocates a wireless resource and transmits a resource allocation message (i.e., a DCI) for allocating resources for a D2D communication to the D2D communication transmitter 620 and the D2D communication receiver 630 through a PDCCH (step S710). In the present embodiment, the DCI transmitted by the base station 610 includes a transmitter resource allocation message (i.e., transmitter DCI) and a receiver resource allocation message (i.e., receiver DCI), where the transmitter DCI may be the same as or different from the receiver DCI. Referring to FIG. 6, the base station 610 first transmits the transmitter DCI to the D2D communication transmitter 620 through the PDCCH at time t4. Then, the base station 410 transmits the receiver DCI to the D2D communication receiver 630 through the PDCCH at time t5.

Next, after receiving the resource allocation message, the D2D communication transmitter 620 and the D2D communication receiver 630 perform a data packet transmission according to the DCI (step S720). The D2D communication transmitter 620 transmits a data packet to the D2D communication receiver 630 at time t6. The difference between time t4 and time t6 is 4 subframes, and time t5 and time t6 belong to the same subframe.

In an embodiment, after the D2D communication receiver 630 receives the data packet, the D2D communication receiver 630 performs a cyclic redundancy check (CRC) and transmits a HARQ feedback packet (i.e., an ACK or NACK signal) to the base station 610 through a PUCCH at a predefined timing according to the CRC result.

Since synchronous HARQ is performed, besides that the base station 610 gets to know whether to keep the pre-allocated wireless resource to be used in HARQ automatic retransmission according to the ACK/NACK signal, the D2D communication transmitter 620 also needs to know whether to drive automatic data retransmission according to the ACK/NACK signal. To be specific, the difference between the present embodiment and the embodiment described above is that in the synchronous HARQ, the D2D communication transmitter 620 has to initiatively receive the HARQ feedback packet sent by the D2D communication receiver 630 to the base station 610 through the PUCCH (step S730). Namely, the D2D communication receiver 630 does not send any ACK/NACK signal to the D2D communication transmitter 620, and the D2D communication transmitter 620 automatically monitors the PUCCH and receives the ACK or NACK signal from the D2D communication receiver 630.

In step S750, if the D2D communication receiver 630 sends a NACK signal back, the base station 610 automatically retains the original wireless resource, and the D2D communication transmitter 620 automatically retransmits the data packet in a predefined subframe (i.e., at a predefined timing), and the D2D communication receiver 630 automatically receives the data packet again.

Because the ACK/NACK signal sent by the D2D communication receiver 630 through the PUCCH is targeted at the base station 610, the D2D communication transmitter 620 may not be able to receive the ACK/NACK signal due to different reasons (for example, the distance between the D2D communication transmitter 620 and the D2D communication receiver 630 is farther than that between the base station 610 and the D2D communication receiver 630). In this case, unlike the HARQ performed for a general uplink/downlink communication, when the D2D communication transmitter 620 cannot receive the HARQ feedback packet, the D2D communication transmitter 620 assumes that the data has been successfully transmitted (while according to existing HARQ, when a transmitter cannot receive a HARQ feedback packet, the transmitter assumes that the data is not successfully transmitted) and does not initiate the automatic data retransmission, so that the situation that the base station 610 thinks the data has been successfully transmitted and accordingly does not retain the wireless resource while the D2D communication transmitter 620 thinks the data is not successfully transmitted and accordingly drives the automatic data retransmission could be avoided.

As described above, in the disclosure, a base station transmits a DCI to a D2D communication transmitter and a D2D communication receiver through a PDCCH and instructs the D2D communication transmitter to transmit a HARQ data packet to the D2D communication receiver. Once the D2D communication receiver receives the HARQ data packet, the D2D communication receiver transmits a HARQ feedback packet (for example, an ACK signal or a NACK signal) to the base station through a PUCCH. When the base station receives the HARQ feedback packet and the HARQ feedback packet is a NACK signal, the base station retains the original wireless resource to allow the D2D communication transmitter to automatically retransmit the HARQ data packet to the D2D communication receiver, or the base station allocates a new wireless resource and transmits another DCI to the D2D communication transmitter and the D2D communication receiver through the PDCCH to instruct the D2D communication transmitter to retransmit the HARQ data packet to the D2D communication receiver. Thereby, the disclosure provides a mechanism which allows a D2D communication transmitter and a D2D communication receiver to realize HARQ with the help of a base station, such that the quality of a D2D communication is maintained.

Figure 8:
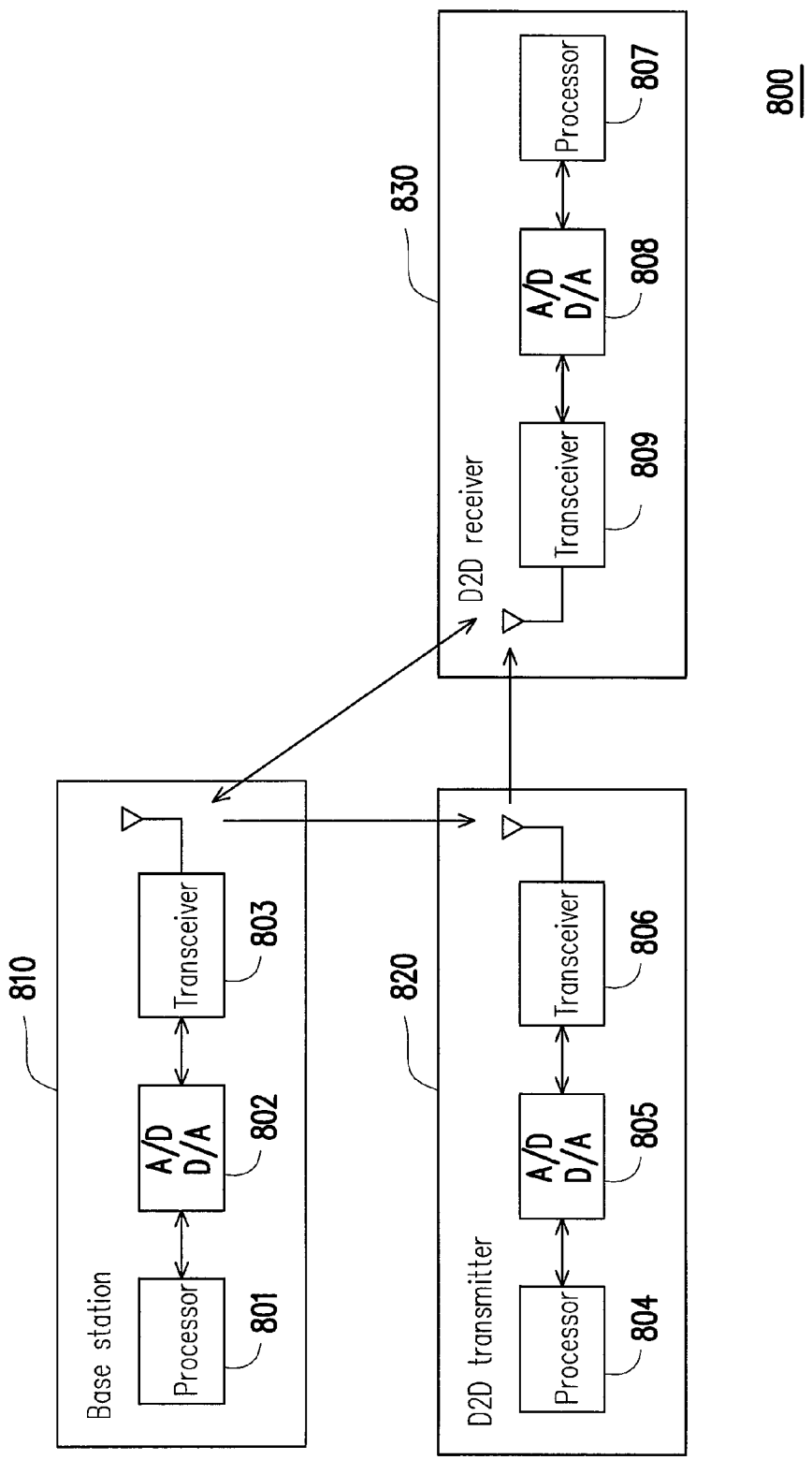
FIG. 8 is a block diagram of a wireless communication system according to an exemplary embodiment of the disclosure.

FIG. 8 is a block diagram of a wireless communication system according to an exemplary embodiment of the disclosure. Referring to FIG. 8, the wireless communication system 800 includes a base station 810 adopting the 3GPP long term evolution advanced (LTE-Advanced) standard and a D2D communication transmitter (i.e., a first mobile device) 820 and a D2D communication receiver (i.e., a second mobile device) 830 that perform a D2D communication.

The base station 810 includes a transceiver 801, an analog-to-digital (A/D)/digital-to-analog (D/A) converter 802, and a processor 803. The transceiver 801 is configured to transmit a downlink signal and/or receive an uplink signal in a wireless manner. The transceiver 801 may also execute other operations, such as low-noise amplification, impedance matching, frequency mixing, frequency raising, or down conversion, filtering, and amplification. The transceiver 801 also includes an antenna unit. The ADC/DAC 802 is configured to convert the uplink signal from an analog signal into a digital signal and convert the downlink signal from a digital signal into an analog signal.

Figure 9:
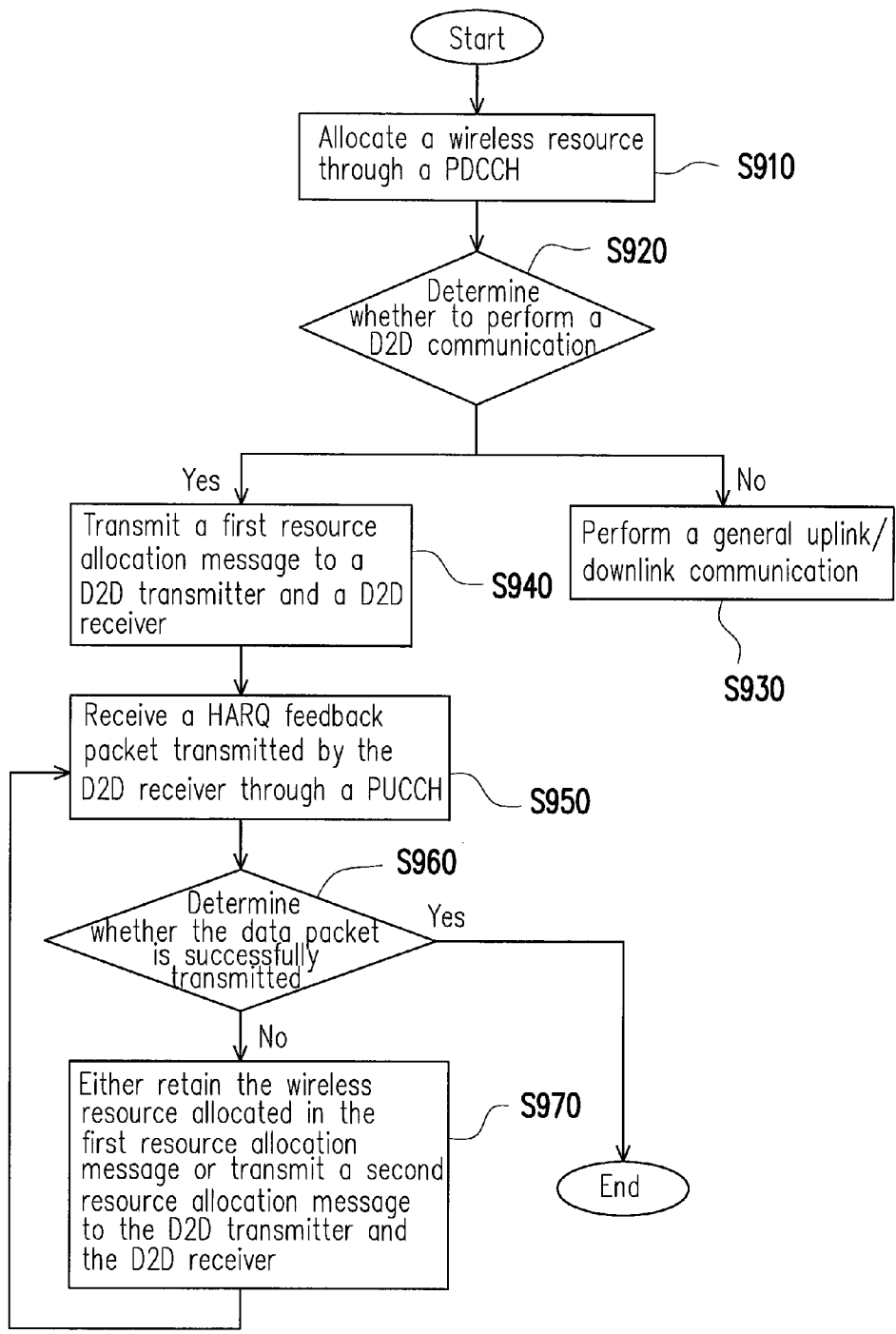
FIG. 9 is a flowchart illustrating how a base station performs three-terminal communication according to an exemplary embodiment of the disclosure.

The processor 803 is configured to process a digital signal and execute the HARQ performing method illustrated in FIG. 9. A wireless resource is allocated through a PDCCH (step S910), and whether to perform a D2D communication is determined (step S920). If the D2D communication is not performed, a general uplink/downlink communication is performed (step S930) (i.e., the downlink communication illustrated in FIG. 3A and the uplink communication illustrated in FIG. 3B are performed). If the D2D communication is to be performed, a first resource allocation message is transmitted to a D2D communication transmitter and a D2D communication receiver (step S940). A HARQ feedback packet transmitted by the D2D communication receiver is received through a PUCCH (step S950). Whether the data packet is successfully transmitted is determined (step S960). If the data packet is not successfully transmitted, the wireless resource allocated in the first resource allocation message is retained or a second resource allocation message is transmitted to the D2D communication transmitter and the D2D communication receiver (step S970). Thereafter, the procedure returns to step S950 until the data packet is successfully transmitted.

The D2D communication transmitter 820 and the D2D communication receiver 830 respectively include a transceiver (806 and 809), an ADC/DAC (805 and 808), and a processor (804 and 807). The processors 804 and 807 are configured to process a digital signal and execute following HARQ performing method. A first resource allocation message transmitted by a base station is received to determine whether to perform a D2D communication. When the first resource allocation message instructs to perform the D2D communication as a D2D communication transmitter, a data packet is transmitted to the D2D communication receiver according to the wireless resource allocated in the first resource allocation message. When the first resource allocation message instructs to perform the D2D communication as a D2D communication receiver, a data packet transmitted by the D2D communication transmitter is received according to the wireless resource allocated in the first resource allocation message, and a HARQ feedback packet is transmitted to the base station to respond that whether the data packet is successfully received.

As described above, in a method for performing HARQ provided by the disclosure, mobile devices (a D2D communication transmitter and a D2D communication receiver) are allowed to realize a HARQ retransmission mechanism in three-terminal communication with the help of a base station, so that the reliability of data transmission is improved and the quality of a D2D communication is maintained.

It will be apparent to those skilled in the art that various modifications and variations could be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for performing hybrid automatic repeat request (HARQ), adapted to a base station in a wireless communication system, the method comprising:
   allocating a wireless resource by using the base station, and determining whether to perform a device-to-device (D2D) communication;
   when the D2D communication is performed, transmitting a first resource allocation message to a first mobile device and a second mobile device by using the base station, so that the first mobile device, which works as a transmitter, transmits a data packet to the second mobile device, which works as a receiver, according to the first resource allocation message;
   receiving a HARQ feedback packet from the second mobile device by using the base station to determine whether the data packet is successfully transmitted; and
   when the HARQ feedback packet is a negative acknowledgement (NACK), transmitting a second resource allocation message to the first mobile device and the second mobile device by using the base station,
   wherein when the HARQ feedback packet is the NACK and an asynchronous HARQ retransmission is performed, the second resource allocation message is simultaneously transmitted to the first mobile device and the second mobile device by using the base station, so that the first mobile device retransmits the data packet to the second mobile device according to the second resource allocation message.

2. The method for performing HARQ according to claim 1, wherein the step of transmitting the first resource allocation message to the first mobile device and the second mobile device by using the base station comprises:
   simultaneously transmitting the first resource allocation message to the first mobile device and the second mobile device by using the base station.

3. The method for performing HARQ according to claim 1, wherein the step of transmitting the first resource allocation message to the first mobile device and the second mobile device by using the base station comprises:
   first transmitting a transmitter resource allocation message to the first mobile device by using the base station, and then transmitting a receiver resource allocation message to the second mobile device by using the base station,
   wherein the first resource allocation message comprises the transmitter resource allocation message and the receiver resource allocation message, and the transmitter resource allocation message is the same as or different from the receiver resource allocation message.

4. The method for performing HARQ according to claim 1, wherein the base station transmits the first resource allocation message and the second resource allocation message through a physical downlink control channel (PDCCH).

5. The method for performing HARQ according to claim 4, wherein the base station adds an indicator in the first resource allocation message and the second resource allocation message to indicate whether the wireless resource is allocated regarding the D2D communication or regarding an uplink/downlink communication.

6. The method for performing HARQ according to claim 4, wherein before the step of transmitting the first resource allocation message or the second resource allocation message by using the base station, the method further comprises:
   scrambling the first resource allocation message or the second resource allocation message by using a cell radio network temporary identifier (C-RNTI) exclusively belonging to the D2D communication.

7. The method for performing HARQ according to claim 1, wherein the step of receiving the HARQ feedback packet from the receiver by using the base station comprises:

receiving the HARQ feedback packet from the second mobile device, which works as the receiver, through a physical uplink control channel (PUCCH) by using the base station.

8. The method for performing HARQ according to claim 1, wherein when the HARQ feedback packet is the NACK and an asynchronous HARQ retransmission is performed, a transmitter resource allocation message is first transmitted to the first mobile device by using the base station, and then a receiver resource allocation message is transmitted to the second mobile device by using the base station, so that the first mobile device retransmits the data packet to the second mobile device according to the transmitter resource allocation message,
wherein the second resource allocation message comprises the transmitter resource allocation message and the receiver resource allocation message, and the transmitter resource allocation message is the same as or different from the receiver resource allocation message.

9. A base station, comprising:
a transceiver, configured to transmit and receive wireless signals; and
a processor, coupled to the transceiver, and configured to execute following operations:
allocating a wireless resource used by at least one mobile device;
when a device-to-device (D2D) communication is performed, transmitting a first resource allocation message to a first mobile device and a second mobile device, so that the first mobile device, which works as a transmitter, transmits a data packet to the second mobile device, which works as a receiver, according to the first resource allocation message;
receiving a hybrid automatic repeat request (HARQ) feedback packet from the second mobile device to deter mine whether the data packet is successfully transmitted; and
when the HARQ feedback packet is a negative acknowledgement (NACK), transmitting a second resource allocation message to the first mobile device and the second mobile device,
wherein when the HARQ feedback packet is the NACK and an asynchronous HARQ retransmission is performed, the processor is configured to simultaneously transmit the second resource allocation message to the first mobile device and the second mobile device, so that the first mobile device retransmits the data packet to the second mobile device according to the second resource allocation message.

10. The base station according to claim 9, wherein the processor is configured to:
simultaneously transmit the first resource allocation message to the first mobile device and the second mobile device.

11. The base station according to claim 9, wherein the processor is configured to:
transmit a transmitter resource allocation message to the first mobile device and then transmit a receiver resource allocation message to the second mobile device,
wherein the first resource allocation message comprises the transmitter resource allocation message and the receiver resource allocation message, and the transmitter resource allocation message is the same as or different from the receiver resource allocation message.

12. The base station according to claim 9, wherein the processor is configured to:

transmit the first resource allocation message and the second resource allocation message to the first mobile device and the second mobile device through a physical downlink control channel (PDCCH).

13. The base station according to claim 12, wherein the processor is further configured to:
adding an indicator in the first resource allocation message and the second resource allocation message to indicate whether the wireless resource is allocated regarding the D2D communication or regarding an uplink/downlink communication.

14. The base station according to claim 12, wherein the processor is further configured to:
scramble the first resource allocation message and the second resource allocation message by using a cell radio network temporary identifier (C-RNTI) exclusively belonging to the D2D communication, and then transmit the scrambled first resource allocation message and second resource allocation message by using the transceiver.

15. The base station according to claim 9, wherein the processor is configured to:
receive the HARQ feedback packet the second mobile device, which works as the receiver, through a physical uplink control channel (PUCCH).

16. The base station according to claim 9, wherein the processor is configured to:
when the HARQ feedback packet is the NACK and an asynchronous HARQ retransmission is performed, first transmit a transmitter resource allocation message to the first mobile device, and then transmit a receiver resource allocation message to the second mobile device, so that the first mobile device retransmits the data packet to the second mobile device according to the transmitter resource allocation message,
wherein the second resource allocation message comprises the transmitter resource allocation message and the receiver resource allocation message, and the transmitter resource allocation message is the same as or different from the receiver resource allocation message.

17. The base station according to claim 9, wherein the base station is a base station conforming to a 3GPP long term evolution-advanced (LTE-A) standard.

18. A method for performing hybrid automatic repeat request (HARQ), adapted to a first mobile device and a second mobile device that perform a device-to-device (D2D) communication in a wireless communication system, the method comprising:
monitoring a first resource allocation message from a base station by using the first mobile device and the second mobile device to determine whether to perform the D2D communication;
when the D2D communication is performed, transmitting a data packet by using the first mobile device, which is instructed to work as a transmitter, to the second mobile device, which is instructed to work as a receiver, according to a wireless resource allocated in the first resource allocation message; and
transmitting a HARQ feedback packet to the base station by using the second mobile device to respond that whether the data packet is successfully received,
wherein when the HARQ feedback packet is a negative acknowledgement (NACK), performing an asynchronous HARQ retransmission by using the first mobile device and the second mobile device, wherein when the first mobile device and the second mobile device perform the asynchronous HARQ retransmission, the method further comprises:
  not expecting to receive the HARQ feedback packet and directly monitoring a physical downlink control channel (PDCCH) by using the first mobile device;
  transmitting the HARQ feedback packet to the base station and then continuously monitoring the PDCCH by using the second mobile device; and
  when the first mobile device and the second mobile device receive a second resource allocation message from the base station, retransmitting the data packet to the second mobile device by using the first mobile device according to a new wireless resource allocated in the second resource allocation message.

19. The method for performing HARQ according to claim 18, wherein the first mobile device and the second mobile device monitor the first resource allocation message from the base station through the PDCCH.

20. The method for performing HARQ according to claim 18, wherein the second mobile device transmits the HARQ feedback packet through a physical uplink control channel (PUCCH).

21. The method for performing HARQ according to claim 18 further comprising:
  determining whether to retransmit the data packet or transmit another data packet according to a new data indicator in the second resource allocation message by using the first mobile device.

22. A mobile device, comprising:
  a transceiver, configured to transmit and receive wireless signals; and
  a processor, coupled to the transceiver, and configured to execute following operations:
  receiving a first resource allocation message from a base station to determine whether to perform a device-to-device (D2D) communication;
  when the first resource allocation message instructs to perform the D2D communication as a transmitter, transmitting a data packet to another mobile device according to a wireless resource allocated in the first resource allocation message; and
  when the first resource allocation message instructs to perform the D2D communication as a receiver, receiving the data packet from the other mobile device according to the wireless resource allocated in the first resource allocation message, and transmitting a hybrid automatic repeat request (HARQ) feedback packet to the base station to respond that whether the data packet is successfully received,
  wherein when the HARQ feedback packet is a negative acknowledgement (NACK), the processor is further configured to perform an asynchronous HARQ retransmission,
  wherein when the mobile device works as the transmitter and performs the asynchronous HARQ retransmission, the processor is configured to:
    directly monitoring a physical downlink control channel (PDCCH), and receiving a second resource allocation message from the base station through the transceiver; and
    retransmitting the data packet to the other mobile device according to a new wireless resource allocated in the second resource allocation message.

23. The mobile device according to claim 22, wherein the processor is configured to:
  receiving the first resource allocation message from the base station through the PDCCH.

24. The mobile device according to claim 22, wherein the processor is configured to:
  transmitting the HARQ feedback packet to the base station through a physical uplink control channel (PUCCH).

25. The mobile device according to claim 22, wherein the second resource allocation message further comprises a new data indicator, and the processor determines whether to retransmit the data packet or transmit another data packet according to the new data indicator.

26. The mobile device according to claim 22, wherein when the mobile device works as the receiver and performs the asynchronous HARQ retransmission, the processor is configured to:
  after transmitting the HARQ feedback packet to the base station, continuously monitor the PDCCH to receive the second resource allocation message from the base station; and
  receive the data packet from the other mobile device again according to a new wireless resource allocated in the second resource allocation message.

27. The mobile device according to claim 26, wherein the second resource allocation message further comprises a new data indicator, and the processor determines whether to receive the data packet again or receive another data packet according to the new data indicator.

28. The mobile device according to claim 22, wherein the mobile device is a mobile device conforming to a 3GPP long term evolution-advanced (LTE-A) standard.

29. A method for performing hybrid automatic repeat request (HARQ), adapted to a base station in a wireless communication system, the method comprising:
  allocating a wireless resource by using the base station, and determining whether to perform a device-to-device (D2D) communication;
  when the D2D communication is performed, transmitting a first resource allocation message to a first mobile device and a second mobile device by using the base station, so that the first mobile device, which works as a transmitter, transmits a data packet to the second mobile device, which works as a receiver, according to the first resource allocation message;
  receiving a HARQ feedback packet from the second mobile device by using the base station to determine whether the data packet is successfully transmitted; and
  when the HARQ feedback packet is a negative acknowledgement (NACK), retaining the wireless resource allocated in the first resource allocation message by using the base station,
  wherein when the HARQ feedback packet is the NACK and an synchronous HARQ retransmission is performed, the HARQ feedback packet is not transmitted to the first mobile device by using the base station and the wireless resource allocated in the first resource allocation message is retained by using the base station, so that the first mobile device automatically retransmits the data packet at a predefined timing to the second mobile device.

30. A base station, comprising:
  a transceiver, configured to transmit and receive wireless signals; and
  a processor, coupled to the transceiver, and configured to execute following operations:
  allocating a wireless resource used by at least one mobile device;

when a device-to-device (D2D) communication is performed, transmitting a first resource allocation message to a first mobile device and a second mobile device, so that the first mobile device, which works as a transmitter, transmits a data packet to the second mobile device, which works as a receiver, according to the first resource allocation message;

receiving a hybrid automatic repeat request (HARQ) feedback packet from the second mobile device to determine whether the data packet is successfully transmitted; and when the HARQ feedback packet is a negative acknowledgement (NACK), retaining the wireless resource allocated in the first resource allocation message, wherein when the HARQ feedback packet is the NACK and an synchronous HARQ retransmission is performed, the processor is configured to not to transmit the HARQ feedback packet to the first mobile device and to retain the wireless resource allocated in the first resource allocation message, so that the first mobile device automatically retransmits the data packet at a predefined timing to the second mobile device.

31. A method for performing hybrid automatic repeat request (HARQ), adapted to a first mobile device and a second mobile device that perform a device-to-device (D2D) communication in a wireless communication system, the method comprising:

monitoring a first resource allocation message from a base station by using the first mobile device and the second mobile device to determine whether to perform the D2D communication;

when the D2D communication is performed, transmitting a data packet by using the first mobile device, which is instructed to work as a transmitter, to the second mobile device, which is instructed to work as a receiver, according to a wireless resource allocated in the first resource allocation message; and transmitting a HARQ feedback packet to the base station by using the second mobile device to respond that whether the data packet is successfully received, wherein when the HARQ feedback packet is a negative acknowledgement (NACK), performing an synchronous HARQ retransmission by using the first mobile device and the second mobile device, wherein when the first mobile device and the second mobile device perform the synchronous HARQ retransmission, the method further comprising:

automatically receiving the HARQ feedback packet transmitted by the second mobile device to the base station through a PUCCH by using the first mobile device;

when the HARQ feedback packet is the NACK, automatically retransmitting the data packet to the second mobile device according to the wireless resource allocated in the first resource allocation message by using the first mobile device; and automatically receiving the data packet again according to the wireless resource allocated in the first resource allocation message by using the second mobile device.

32. The method for performing HARQ according to claim 31, wherein when the first mobile device does not receive the HARQ feedback packet through the PUCCH, the data packet is considered being successfully transmitted and is not automatically retransmitted.

33. A mobile device, comprising:
a transceiver, configured to transmit and receive wireless signals; and
a processor, coupled to the transceiver, and configured to execute following operations:
receiving a first resource allocation message from a base station to determine whether to perform a device-to-device (D2D) communication;
when the first resource allocation message instructs to perform the D2D communication as a transmitter, transmitting a data packet to another mobile device according to a wireless resource allocated in the first resource allocation message; and
when the first resource allocation message instructs to perform the D2D communication as a receiver, receiving the data packet from the other mobile device according to the wireless resource allocated in the first resource allocation message, and transmitting a hybrid automatic repeat request (HARQ) feedback packet to the base station to respond that whether the data packet is successfully received,
wherein when the HARQ feedback packet is a negative acknowledgement (NACK), the processor is further configured to perform an synchronous HARQ retransmission,
wherein when the mobile device works as the transmitter and performs the synchronous HARQ retransmission, the processor is configured to:
automatically receive the HARQ feedback packet transmitted by the other mobile device to the base station through a physical uplink control channel (PUCCH); and
when the HARQ feedback packet is the NACK, automatically retransmit the data packet to the other mobile device according to the wireless resource allocated in the first resource allocation message.

34. The mobile device according to claim 33, wherein when the mobile device does not receive the HARQ feedback packet through the PUCCH, the processor is configured to consider that the data packet is successfully transmitted and not automatically retransmit the data packet.

35. The mobile device according to claim 34, wherein when the mobile device works as the receiver and performs the synchronous HARQ retransmission, the processor is configured to:
after transmitting the HARQ feedback packet to the base station, automatically receive the data packet again according to the wireless resource allocated in the first resource allocation message.

* * * * *